(12) United States Patent
O'Sullivan et al.

(10) Patent No.: US 10,211,465 B2
(45) Date of Patent: Feb. 19, 2019

(54) POWDERED METAL COMPONENT (71) Applicant: PLANSEE SE, Reutte (AT)

(72) Inventors: Michael O'Sullivan, Ehenbichl (AT); Lorenz Sigl, Lechaschau (AT); Marco Brandner, Waltenhofen (DE); Andreas Venskutonis, Reutte (AT); Wolfgang Kraussler, Weissenbach (AT)

(73) Assignee: Plansee SE, Reutte (AT)

( * ) Notice: Subject to any disclaimer, the term of this patent is extended or adjusted under 35 U.S.C. 154(b) by 132 days.

(21) Appl. No.: 14/915,957

(22) PCT Filed: Aug. 19, 2014

(86) PCT No.: PCT/AT2014/000161
§ 371 (c)(1),
(2) Date: Mar. 2, 2016

(87) PCT Pub. No.: WO2015/027257
PCT Pub. Date: Mar. 5, 2015

(65) Prior Publication Data
US 2016/0211531 A1 Jul. 21, 2016

(30) Foreign Application Priority Data
Sep. 2, 2013 (AT) .................. GM280/2013

(51) Int. Cl.
*H01M 8/0232* (2016.01)
*C22C 1/04* (2006.01)
(Continued)

(52) U.S. Cl.
CPC ......... *H01M 8/0232* (2013.01); *B22F 1/0003* (2013.01); *B22F 1/0011* (2013.01); *B22F 3/162* (2013.01); *B22F 5/00* (2013.01); *B22F 5/006* (2013.01); *B22F 9/20* (2013.01); *C22C 1/045* (2013.01); *C22C 1/08* (2013.01); *C22C 1/1078* (2013.01); *C22C 27/06* (2013.01); *C22C 32/0026* (2013.01); *C23C 8/12* (2013.01); *C23C 8/16* (2013.01); *H01M 2/202* (2013.01); *H01M 8/0243* (2013.01); *H01M 8/12* (2013.01); *B22F 2003/247* (2013.01); *B22F 2005/005* (2013.01);
(Continued)

(58) Field of Classification Search
None
See application file for complete search history.

(56) References Cited

U.S. PATENT DOCUMENTS 4,950,327 A 8/1990 Eck et al.
5,241,745 A 9/1993 Kippenberg
(Continued)

FOREIGN PATENT DOCUMENTS

CN 1501537 A 6/2004
EP 0510495 A1 10/1992
(Continued)

*Primary Examiner* — Wyatt P McConnell
(74) *Attorney, Agent, or Firm* — Laurence A. Greenberg; Werner H. Stemer; Ralph E. Locher (57) ABSTRACT

A powder metallurgical component has a chromium content of at least 80% by weight and pores and/or oxide inclusions which are present in the component. The number per unit area of a sum of pores and oxide inclusions at a cut surface through the component in at least one region is at least 10,000 per mm².

18 Claims, 4 Drawing Sheets

(51) Int. Cl.

| | |
|---|---|
| *C22C 1/10* | (2006.01) |
| *C22C 32/00* | (2006.01) |
| *B22F 5/00* | (2006.01) |
| *B22F 9/20* | (2006.01) |
| *C22C 1/08* | (2006.01) |
| *B22F 1/00* | (2006.01) |
| *B22F 3/16* | (2006.01) |
| *C22C 27/06* | (2006.01) |
| *C23C 8/12* | (2006.01) |
| *C23C 8/16* | (2006.01) |
| *H01M 2/20* | (2006.01) |
| *H01M 8/0243* | (2016.01) |
| *H01M 8/12* | (2016.01) |
| *H01M 8/124* | (2016.01) |
| *B22F 3/24* | (2006.01) |

(52) U.S. Cl.
CPC ..... *B22F 2201/013* (2013.01); *B22F 2201/03* (2013.01); *B22F 2201/04* (2013.01); *B22F 2201/05* (2013.01); *B22F 2301/20* (2013.01); *B22F 2998/10* (2013.01); *B22F 2999/00* (2013.01); *H01M 2008/1293* (2013.01)

(56) References Cited

U.S. PATENT DOCUMENTS

| | | | |
|---|---|---|---|
| 5,302,181 | A | 4/1994 | Morichika et al. |
| 5,320,181 | A * | 6/1994 | Lantier, Sr. ............. E21B 21/10 |
| | | | 166/325 |
| 5,407,758 | A | 4/1995 | Greiner et al. |
| 7,390,456 | B2 | 6/2008 | Glatz et al. |
| 9,029,044 | B2 | 5/2015 | Brandner et al. |
| 2004/0126631 | A1 | 7/2004 | Uchida et al. |
| 2010/0233576 | A1* | 9/2010 | Brandner ................ C22C 32/00 |
| | | | 429/491 |
| 2011/0135531 | A1 | 6/2011 | Hsu et al. |
| 2013/0130152 | A1 | 5/2013 | Couse et al. |

FOREIGN PATENT DOCUMENTS

| | | |
|---|---|---|
| EP | 0578855 B1 | 4/1996 |
| EP | 2230707 A1 | 9/2010 |
| JP | H01502680 A | 9/1989 |
| JP | H04325651 A | 11/1992 |
| JP | H0633166 A | 2/1994 |
| JP | H0820809 A | 1/1996 |
| JP | 2004517215 A | 6/2004 |
| JP | 2010219045 A | 9/2010 |
| WO | 9015425 A1 | 12/1990 |

* cited by examiner

POWDERED METAL COMPONENT

BACKGROUND OF THE INVENTION

Field of the Invention

The invention relates to a powder metallurgical component having a chromium content of at least 80% by weight, wherein pores and/or oxide inclusions are present in the component, and to a process for the production thereof. The invention relates further to an interconnector for an electrochemical cell obtainable from such a powder metallurgical component, and to an interconnector for an electrochemical cell which has a region with a chromium content of at least 80% by weight, wherein pores and/or oxide inclusions are present in the region. Finally, the invention relates to the use of an interconnector for the production of an electrochemical cell.

For connecting solid oxide fuel cells (SOFCs) or similar electrochemical cells to form a stack, for use at operating temperatures between 700° C. and 950° C., there are suitable in particular components, so-called interconnectors, having high Cr contents. They can be produced, for example, from Cr-base alloys of the composition Cr5FeY, as described in EP 0 578 855. These components substantially provide electrical contacting of the individual electrochemical cells, conduction of the reaction gases, and separation of the reaction gases of adjacent cells. In order to ensure separation of the gas compartments of adjacent cells, the components must have high gas tightness, or low gas permeability.

The manufacture of interconnectors is carried out in the prior art in an inexpensive manner by a powder metallurgical net-shape or near net-shape process technique, which comprises the steps of preparing a powder batch, pressing the powder, presintering, optional calibration sintering, and sintering under a reducing atmosphere. When Cr powders that are currently available commercially are used, such interconnectors still do not have sufficient gas tightness after the sintering process. There is a residual porosity of between 4 and 12% by volume with a very coarse pore structure, which in some cases is open. This residual porosity is minimized in a purposive oxidation process to such an extent that adequate gas tightness for the application can be achieved. This is possible because the resulting $Cr_2O_3$ or mixed oxides of Cr and Al (see US 2010/0233576 A) have a larger volume than the metallic matrix, so that the porosity is closed up in the course of the oxidation process. It is not necessary for all the pores to the core of the component to be filled with oxides, but at least an edge layer approximately 0.2 mm thick is closed. The resulting oxide layer on the surface of the component is removed again in particular in a subsequent process at least in the region of the electrical contact faces, for example by a sand-blasting process, in order to ensure optimum metallic contact between the electrochemical cell and the interconnector at the start of operation.

Even though sufficient gas tightness can be achieved by the additional step of oxidation with subsequent sand-blasting, this process can cause some difficulties. The following points are to be mentioned:
  Components with high residual porosity, or even only with regions of high residual porosity, require either oxidation at high temperatures or very long holding times at temperature in order to form a sufficient amount of oxide inclusions having chromium oxide as the main constituent, especially when large open pores are present in the component. High oxidation temperatures and long holding times are associated with corresponding costs in manufacture.
  A high degree of oxide inclusions leads to a change in the desired physical properties of the component (e.g. thermal expansion coefficient, thermal conductivity, fracture behaviour), because these are increasingly determined not only by the metallic matrix but also by the pore filler. This change can affect the component as a whole or only selected regions of the component, as a result of which the component becomes inhomogeneous.
  If the degree of oxide inclusions is too high, in particular if the porosity differs locally, which is frequently the case in real components because of the different structure on either side of the plate, this has the result that the component is a reject on account of excessive distortion and must be discarded.
  In the oxidation, as well as the formation of oxide inclusions, the formation of Cr nitrides can also occur, and these can likewise change the desired physical properties of the component.

BRIEF SUMMARY OF THE INVENTION

Accordingly, the object of the present invention is to find a remedy and provide a powder metallurgical component in which the described disadvantages are reduced. In particular, the powder metallurgical component is to have low gas permeability, is to be inexpensive to produce and at the same time is to be as free as possible of undesirable impurities such as chromium nitrides.

That object is achieved by a powder metallurgical component having a chromium content of at least 80% by weight, wherein there is present in the component at least one structural constituent from the group pores and oxide inclusions, which component is characterized in that the number per unit area of the sum of pores and oxide inclusions along a cut surface through the component in at least one region is at least 10 000 per $mm^2$. Pores and/or oxide inclusions are therefore present in the component. In addition, pores that are partly filled with oxide inclusions also occur. Partly filled pores are subsumed under pores hereinbelow. Partly filled pores are therefore counted as pores.

Oxide inclusions can form in the component by oxidation of chromium, optionally other metals that are present and addition of metal oxides. In the oxidation operation, other compounds, for example nitrides, may also form, which can likewise form part of the oxide inclusions. Within the scope of the invention, therefore, the expression oxide inclusions is to be understood as meaning inclusions whose main constituent (>50 mol. %) is metal oxides and which may also additionally comprise nitrides. The main constituent of the oxide inclusions is preferably chromium oxides, the chromium oxide content preferably being at least 90 mol. %.

In comparison with the prior art, such a component has a significantly higher total number of pores and oxide inclusions while having approximately the same porosity, so that the pore volume is distributed over more, and thus finer, pores. The invention is based inter alia on the finding that the pore size has a significant influence on the component. The number of large pores in particular should be as small as possible, because such pores filled with $Cr_2O_3$ have a negative influence on the component, for example in terms of distortion or the thermal expansion coefficient.

In one variant embodiment it is provided that the number of the sum of pores and oxide inclusions along the cut surface is at least 20 000, preferably at least 40 000, particularly preferably at least 60 000 per mm². In a preferred variant embodiment it is provided that the number of the sum of pores and oxide inclusions along the cut surface is at least 90 000 per mm². The larger the sum of pores per unit area before the oxidation operation, the more effectively and economically they can be closed up by oxidation.

According to the invention, pores are understood as being the sum of all open pores, closed pores and also pores that are at least partly filled with oxide. Because a component according to the invention is subjected to an oxidation operation, previously open pores are at least partly filled with oxides by the oxidation. The closed pores and the previously open pores, which are now completely or partly filled with oxide, remain.

In a preferred variant embodiment it is provided that the chromium content in the region is at least 90% by weight. A high chromium content increases the thermal conductivity and accordingly contributes towards homogeneous temperature distribution in the system. In addition, a high chromium content lowers the thermal expansion coefficient so that it is better adapted to currently available electrolyte materials such as fully stabilized zirconium oxides.

In one variant embodiment it can be provided that, in the region of the component, the density over the entire component thickness is less than 95% of the theoretical density. In a further variant embodiment it can be provided that, in the region of the component, the density over the entire component thickness is between 70% and 95% of the theoretical density. This value range ensures good mechanical stability of the component.

In an advantageous variant embodiment it can be provided that at least 90% of the pores and oxide inclusions at a cut surface in at least one region have an equivalent diameter of not more than 12 μm. This has a positive effect on the mechanical properties of the component and permits rapid closing of the open pores in the course of the oxidation process. Equivalent diameter means that, in the case of pores and oxide inclusions with a non-circular cross-section, the cross-sectional area A is used, and the equivalent diameter d is obtained by equating the calculated cross-sectional area A with the formula $A=\pi d^2/4$. The equivalent diameter d is then given by the relationship $d=(4 A/\pi)^{0.5}$.

The invention is based inter alia on the finding that the oxidation operation can have a negative effect on the homogeneity of the component in terms of distortion and thermal expansion. By using metal powder in which the BET surface area is ≥0.05 m²/g to produce the component, the oxidation operation for closing the pores can be kept shorter, so that the oxide content is reduced. Therefore, in one variant embodiment it can be provided that the total oxygen content in this region is <20 000 μg O per 1 g component.

Investigations have shown that the presence of nitrogen and/or other oxidic components can have a negative effect on the component in terms of distortion and thermal expansion. It is therefore provided in one variant embodiment that the total nitrogen content in this region is <2000 μg per 1 g component and/or that the content of $Al_2O_3$ is <500 μg per 1 g component. A low nitrogen content has a positive effect on the properties of the component when used for electrochemical cells in that low distortion occurs and the thermal expansion coefficient is uniform over the component thickness.

It is preferably provided that the oxygen content increases along the component thickness from the middle to the edges.

During sintering of the metal powder there forms a porous component, the pore size distribution of which is dependent substantially on the physical properties of the metal powder, such as, for example, the specific surface area, and on the pressing and sintering conditions.

Furthermore, the component preferably has at least one of the properties mentioned above, in particular the number of the sum of pores/oxide inclusions, size/area of the pores/oxide inclusions, or oxygen/nitrogen content in a region which, based on the total volume of the component, is greater than 25% by volume, particularly preferably greater than 75% by volume.

According to the invention, such a component can be produced by a process described hereinbelow, so that the process also achieves the object stated at the beginning.

The process comprises the steps:
(i) providing a powder batch comprising chromium and optionally other metals,
  the content of chromium being at least 80% by weight, based on the total
  metal content, the powder of the powder batch having a BET surface area
  of 0.05 m²/g,
(ii) pressing the powder batch to form a compact,
(iv) sintering the compact at from 1100 to 1500° C.,
(v) oxidizing the sintered component in the presence of an oxygen source,
(vi) removing the oxide layer from the surface.

The BET surface area can be adjusted, for example, by grinding chromium powder or a chromium alloy. Powder batches having BET surface areas of up to 0.5 m²/g were used to produce the component.

Between step (ii) pressing the powder batch to form a compact and step (iv) sintering the compact at from 1100 to 1500° C., a step (iii) presintering the compact at from 600 to 1000° C. can be provided.

Preferably, it is further provided that the sintering step and, where present, also or in its place the presintering step can be carried out under a hydrogen atmosphere.

For homogenizing the properties of the component, a calibration pressing operation can be provided between the presintering step and the sintering step. This calibration pressing operation can be carried out at a specific pressing pressure of from 500 to 1000 MPa.

Furthermore, it can preferably be provided that a pressing aid is added to the powder batch in an amount of from 0.1% by weight to 5% by weight, based on the amount of the powder batch, before pressing. A suitable pressing aid is, for example, a wax.

After sintering, oxidation of the component is carried out. The oxygen source can be any desired oxygen source. Studies have shown that it can be selected, for example, from the group $H_2O$, $O_2$, $CO_2$ or mixtures thereof.

By using a chromium powder or a metal powder comprising chromium having a larger specific surface area as compared with the prior art, the pore diameter, in particular the maximum pore diameter, can be reduced significantly. Significantly less chromium oxide is thus formed in the pores of the component in order to achieve the required gas tightness. Ideally, the oxidation process can be omitted altogether if only closed porosity is still present after sintering.

This gives rise on the one hand to technical advantages and on the other hand to the possibility of reducing production costs. By reducing the amount of pore filler, the risk of distortion of the component or of an uncontrolled change of important physical properties (thermal expansion coefficient, thermal conductivity, . . . ) is reduced. Oxidation at a lower temperature or for a shorter time additionally lowers the manufacturing costs.

There are various possible uses of the component according to the invention produced by powder metallurgy. A preferred possible use is electrochemical cells. Use as an interconnector for an electrochemical cell is particularly preferred. The interconnector has a chromium content of at least 80% by weight and pores and/or oxide inclusions, wherein the number per unit area of the sum of pores and oxide inclusions at a cut surface through the interconnector in at least one region is at least 10 000 per mm$^2$.

Furthermore, the interconnector preferably has one or more of the following properties:

The number per unit area of the sum of pores and oxide inclusions at a cut surface is ≥90 000 per mm$^2$.

The chromium content is ≥90% by weight.

The density over the entire component thickness is between 70% and 95% of the theoretical density.

At least 90% of the pores and oxide inclusions have a maximum equivalent diameter of not more than 12 μm.

At least 90% of the pores and oxide inclusions have an area of not more than 100 μm$^2$.

The total oxygen content in a region is <20 000 μg per 1 g component.

The total nitrogen content in a region is <2000 μg per 1 g component.

The content of $Al_2O_3$ in a region is <500 μg per 1 g component.

The oxygen content increases over the component thickness from the middle to the edges of the interconnector.

The described invention accordingly also includes an interconnector, produced by powder metallurgy, of Cr or a Cr-containing alloy, which interconnector, as compared with the prior art, has a significantly finer microstructure, especially a finer pore structure. This gives rise to the possibility of manufacturing a gas-tight part with a significantly reduced content of pore filler (chromium oxide by purposive oxidation), which on the one hand leads to physical properties which can better be controlled and on the other hand lowers the manufacturing costs.

Accordingly to currently available studies, components according to the invention are particularly suitable for interconnectors for electrochemical cells. Consequently, the invention relates in one aspect to an interconnector for an electrochemical cell which has a region having a chromium content of at least 80% by weight, wherein pores and/or oxide inclusions are present in the region, which interconnector is characterized in that a) the region has a density between 70% and 95% of the theoretical density, b) the total oxygen content in the region is <20 000 μg per 1 g, and c) the gas permeability in the region is <10 ml/min at a test pressure of 2.75 bar and a temperature of 20° C.

The gas permeability is determined by means of the differential pressure method. In this case, an excess pressure of 2.75 bar is applied to one side of the component. The test gas is air and the temperature is 20° C. The test circuit is closed and, after a settling phase of a few seconds, the pressure drop over the test period is measured. A factor for converting the pressure loss per unit time into a volume flow (unit ml/min) can be established by means of a calibrated test leak in an otherwise tight test circuit. By means of this conversion, the measurement becomes independent of the volume of the test circuit.

In a preferred variant embodiment it is provided that the number of the sum of pores and oxide inclusions at a cut surface through the region is at least 10 000 per mm$^2$.

In one variant embodiment it is provided that the number of the sum of the pores and oxide inclusions along the cut surface is at least 20 000, preferably at least 40 000, particularly preferably at least 60 000 per mm$^2$. In a preferred variant embodiment it is provided that the number of the sum of pores and oxide inclusions along the cut surface is at least 90 000 per mm$^2$. The larger the number of pores per unit area, the more economically the pores can be closed up by oxidation.

It is preferably provided that the chromium content is at least 90% by weight.

In an advantageous embodiment of the invention it can be provided that at least 90% of the pores and oxide inclusions present along the cut surface have a maximum equivalent pore diameter of not more than 12 μm.

It can further be provided that at least 90% of the pores and oxide inclusions present along the cut surface have an area of not more than 100 μm$^2$.

It is preferably provided that the total nitrogen content in the region is <2000 μg per 1 g.

It can further be provided that the content of $Al_2O_3$ in the region is <500 μg per 1 g.

Further details and advantages of the invention are explained hereinbelow with reference to exemplary embodiments and figures.

BRIEF DESCRIPTION OF THE SEVERAL VIEWS OF THE DRAWING

FIGS. 5a to 8b show a comparison between a component according to the invention (FIG. 5a, 6a, 7a, 8a) and the prior art (FIG. 5b, 6b, 7b, 8b); FIG. 5a-6b show SEM images; FIG. 7a, 7b describe equivalent diameters of pores and chromium oxide inclusions; FIG. 8a, 8b describe the pore area distribution.

DESCRIPTION OF THE INVENTION

Exemplary Embodiment 1 (Single Pressing Operation)

Chromium powder for a powder batch can be obtained as follows. $Cr_2O_3$ of pigment grade (Nippon Denko ND812) is mixed thoroughly with crystalline synthetic graphite powder (Timcal Timrex KS6). The carbon content of the mixture so prepared is 2.85 mol per mol $Cr_2O_3$. 200 g of this mixture are heated in an aluminium oxide crucible in a flow reactor to 800° C. at a heating rate of 10 K/min and then to 1050° C. at a heating rate of 2 K/min. Heating was carried out under the action of $H_2$, the $H_2$ pressure being so adjusted that the $CH_4$ partial pressure, measured by mass spectrometry, in the temperature range from 800° C. to 1050° C. was >15 mbar. The total pressure was approximately 1 bar. The reaction mixture was then heated to 1350° C. at a heating rate of 10 K/min. The holding time at 1350° C. was 180 min. Heating from 1050° C. to 1350° C. and holding at 1350° C. were carried out with the supply of dry hydrogen with a dewpoint<−40° C., the pressure being approximately 1 bar. Furnace cooling was likewise carried out under $H_2$ with a dewpoint<−40° C. After the reaction, a metallic "sponge" is obtained, which can very easily be deagglomerated to a powder. The oxygen content in a test was 503 μg/g.

A powder batch consisting of 95% by weight fine Cr powder (having a BET surface area of ≥0.05 $m^2$/g, granulated to form a more readily pourable powder having a particle size fraction of 45-250 μm) and 5% by weight of an FeY master alloy (alloy with 0.8% by weight Y, particle size<100 μm) is then prepared.

1% by weight of pressing aid (wax) is added to the powder batch. This mixture is then mixed for 15 min in a tumbling mixer. This mixture is introduced into a mould and pressed at a specific pressing pressure of from 500 to 1000 MPa so that a compact is formed. The compact is then presintered at 900° C. for 20 min (time at maximum temperature) under a hydrogen atmosphere in a conveyor furnace for the purpose of dewaxing the compact. After presintering, high-temperature sintering of the component is carried out at 1450° C. for 7 h (time at maximum temperature) under a hydrogen atmosphere for the purpose of further densification and alloy formation. The sintered component then obtained is porous and not yet gas-tight. Oxidation of the component is therefore carried out at 950° C. for a period of from 10 to 30 h in order to close up any residual porosity to such an extent that the permeability is sufficiently low. The surface of the oxidized component is freed of the oxide layer by a sand-blasting process on all sides.

Exemplary Embodiment 2 (Two Pressing Operations)

The compact is produced as in Exemplary Embodiment 1: A powder batch consisting of 95% by weight fine Cr powder (having a BET surface area of ≥0.05 $m^2$/g, granulated to form a more readily pourable powder of fraction 45-250 μm) and 5% by weight of an FeY master alloy (alloy with 0.8% by weight Y, particle size<100 μm) is first prepared.

1% by weight of pressing aid (wax) is added to the powder batch, and this mixture is then mixed for 15 min in a tumbling mixer. This mixture is introduced into a mould and pressed at a specific pressing pressure of from 500 to 1000 MPa so that a compact is formed.

The compact is then presintered at 900° C. for 20 min (time at maximum temperature) under a hydrogen atmosphere in a conveyor furnace for the purpose of dewaxing the compact. After presintering, calibration pressing of the presintered component is provided at a specific pressing pressure of from 500 to 1000 MPa.

After calibration pressing, high-temperature sintering of the component is carried out at 1450° C. for 7 h (time at maximum temperature) under a hydrogen atmosphere for the purpose of further densification and alloy formation. The sintered component then obtained is porous and not yet gas-tight. Oxidation of the component is therefore carried out at 950° C. for a period of from 10 to 30 h in order to close up any residual porosity to such an extent that the gas permeability is sufficiently low. The surface of the oxidized component is freed of the oxide layer by a sand-blasting process on all sides.

Components according to the invention in the form of interconnectors were analysed more closely and compared with the prior art.

Figure 1A:
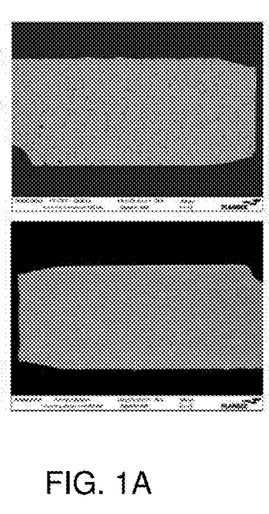
FIG. 1a to 1c show three different regions of components according to the invention (bottom line) in comparison with components having the same geometry according to the prior art (top line).
Figure 1B:
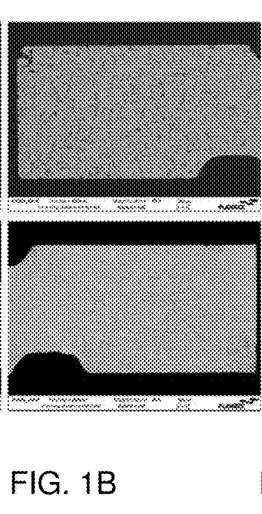
Figure 1C:
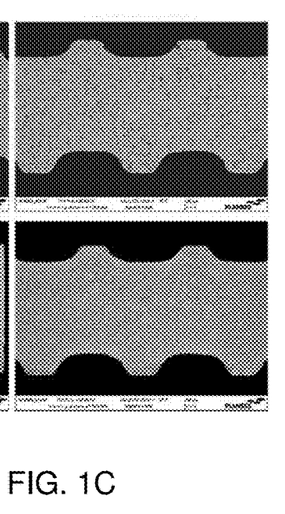
Figure 2:
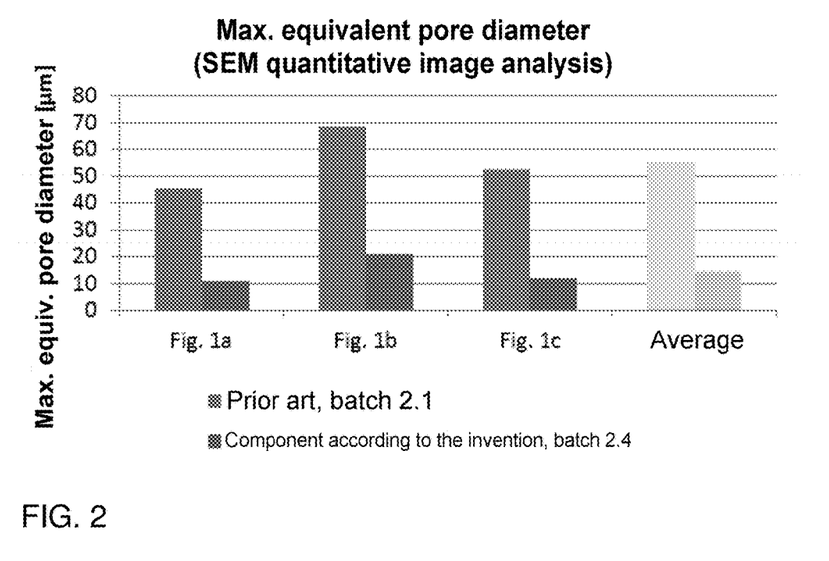
FIG. 2 shows the maximum equivalent diameter (equivalent pore diameter) of pores and oxide inclusions of the three regions from FIGS. 1a to 1c and the mean value calculated therefrom.
Figure 3:
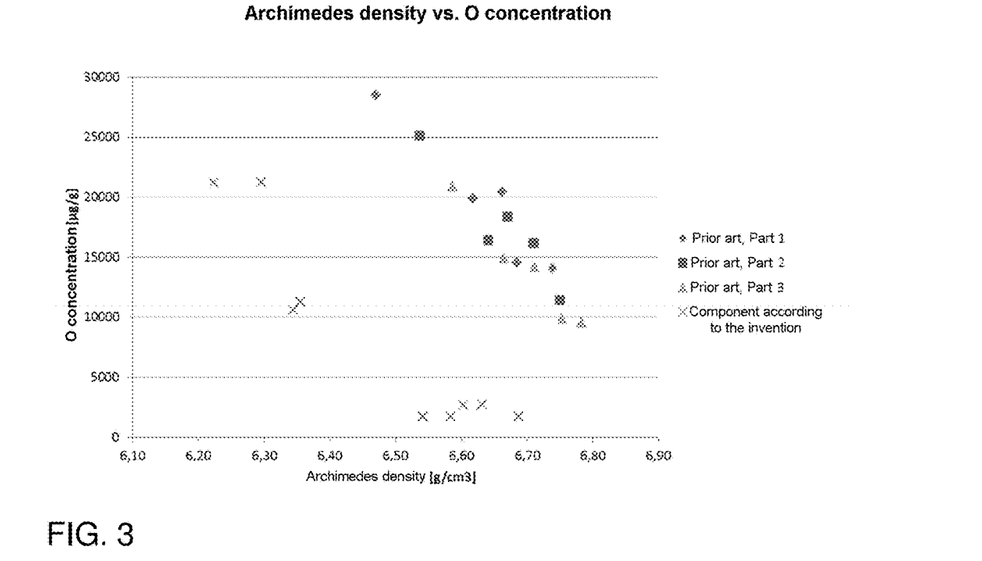
FIG. 3 shows the oxygen content (O concentration) of the component in dependence on the density (Archimedes density) in regions of components.
Figure 4:
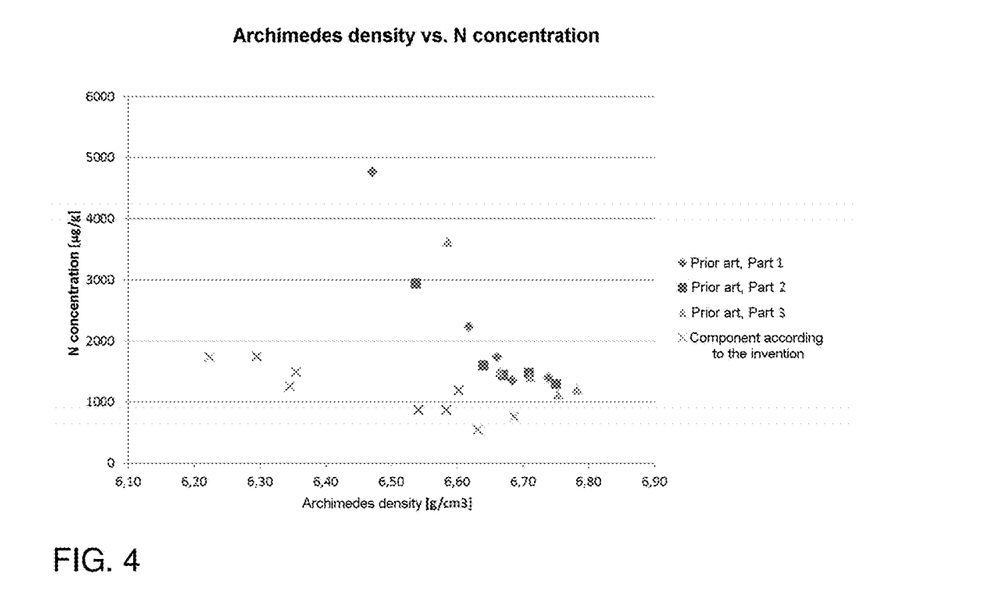
FIG. 4 shows the nitrogen content (N concentration) of the component in dependence on the density (Archimedes density) in regions of components.

In a direct comparison, components of commercially available chromium powder produced by aluminothermic means and components according to the invention of a test powder charge with the same parameters were pressed, presintered and sintered. It is apparent from FIG. 1a to 1c that the microstructure and in particular the pore structure of the components according to the invention are significantly finer (bottom line) that those of the reference component according to the prior art (top line). This visual impression could also be determined and confirmed numerically. The maximum pore diameter in particular is significantly reduced in the form according to the invention (FIG. 2). The components were subjected to the same oxidation program, although the components according to the invention required a shorter oxidation time or a lower oxidation temperature in order to achieve the same gas tightness. The background to this operation was to determine the maximum expected oxygen content in the components according to the invention in order to achieve a reliable delimitation from the prior art. It is apparent from FIG. 3 that a component according to the invention, while having a comparable local density (determined by means of the Archimedes method), has a significantly lower oxygen concentration than does a reference component according to the prior art. In a component according to the invention, the nitrogen concentration (FIG. 4) is also lower than in the prior art, with a comparable local density.

Description of the quantitative image analysis for determining the number of pores and/or oxide inclusions:

For the quantitative image analysis, the components were cut perpendicularly to their areal extent by means of a diamond wire saw into segments having an edge length of approximately 20 mm. Regions that have a mean local density and are representative of the component as a whole were chosen. In the case of interconnectors for fuel cells, that is in most cases the structured, central region of the components, the so-called flow field. The blanks were cleaned with water and then dried. The dried blanks were embedded in epoxy resin. After a curing time of at least 8 hours, the cut edges of the samples were prepared metallographically, that is to say an examination over the thickness of the component can later be carried out. The preparation comprises the steps:

grinding at from 150 to 240 N with firmly bonded SiC paper of grit sizes 240, 320, 400, 800, 1000, 1200 and 2400 grit;

fine grinding with 9 μm $Al_2O_3$ lapping paper;

polishing with diamond suspensions, first with 3 μm grain size and then with 1 μm grain size;

final polishing with a diamond suspension of grain size 0.04 μm;

cleaning of the specimens in an ultrasonic bath;

drying of the specimens.

Five images of different, representative regions of the ground surface were then prepared for each specimen. This was carried out by means of scanning electron microscopy ("Ultra Plus 55" from Zeiss) using a 4-quadrant annular detector to detect back-scattered electrons (BSE). The excitation voltage was 20 kV, the tilt angle was 0°. The images were focussed, the resolution should be at least 1024×768 pixels for correct image analysis. The contrast was so chosen that both the pores and any oxide inclusions present clearly stand out from the metallic matrix. The magnification for the images was so chosen that each image contains at least 100 pores/oxide inclusions. In the present case, this gave image areas of from 0.04 to 0.25 mm².

The quantitative image analysis was carried out using "QWin" software from Leica. The "QXCount" module was used. Each image analysis followed the steps:
- setting a grey level threshold so that both open pore volume and also chromium oxide filling in the pores were detected together as "pore", that is to say a pore is in this case chromium oxide plus any void present;
- fixing the measure frame, in this case the entire image area;
- measurement options: classification by equivalent diameter;
- detection adjustment: dark objects, fill holes, remove edge particles, open reconstruct.

Filter functions should not be used either in the image or in the analysis of the images. Because the pores appear darker in a back-scattered electron image than the metallic matrix, the "dark objects" must be defined as pores in the detection adjustment. It can occur, for example owing to partial filling of the pores with oxide, that the whole pore is not detected as an object. The option "fill holes" is to be used in order to detect the pore, and thus its area, as an associated object. By means of the option "remove edge particles", incomplete pores in the edge region of the image area are not included in the evaluation.

After the 5 images had been analysed individually in each case, a statistical evaluation of the data of all 5 images was carried out. The following parameters were used for this evaluation:
- proportion by surface area of the pores (%)
- pore density (1/mm²)
- equivalent diameter (μm)
- pore area (μm²).

Description of the Chemical Analysis of Oxygen and Nitrogen:

For the analysis of oxygen and nitrogen in a component, oxidized components whose surfaces had been freed of the outer oxide layers by means of sand-blasting with $Al_2O_3$ were always used. This left the metallic matrix and the pores filled with oxide and possible contaminations with nitrogen. In order to analyse the lateral distribution of oxygen and nitrogen in a component, test pieces were cut out of the components with a Yb-YAG laser. The choice of parameters should be such that oxidation or nitration of the cut edges does not occur. In order to determine the distribution of oxygen and nitrogen over the thickness of the component, 250 μm of material were removed layer-wise using a milling machine. The milling machine was operated without coolants and lubricants for this purpose. With this type of sampling too, it must be ensured that oxidation or nitration of the shavings of material does not occur.

Irrespective of the type of sample, analysis was always carried out by means of carrier gas hot extraction. In order to determine the oxygen concentration, in each case 0.2 to 0.5 g of sample was weighed in a platinum crucible, and the oxygen was extracted in the inert gas stream. The extraction temperature is approximately 2000° C. The extraction time depends on the oxygen content of the sample but is at least 40 seconds. During the extraction, the oxygen that is released reacts with carbon from the graphite crucible and forms $CO/CO_2$, which is analysed by means of IR spectrometry.

Determination of the nitrogen concentration was carried out together with the oxygen measurement. The determination of the concentration was in this case carried out via the thermal conductivity of the gas stream that is released.

Figure 5A:
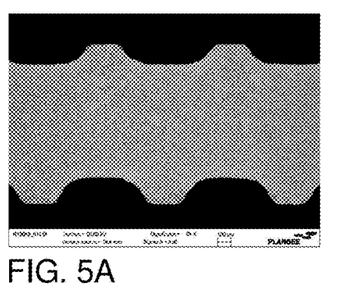
Figure 5B:
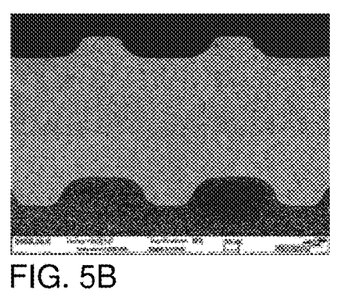
Figure 6A:
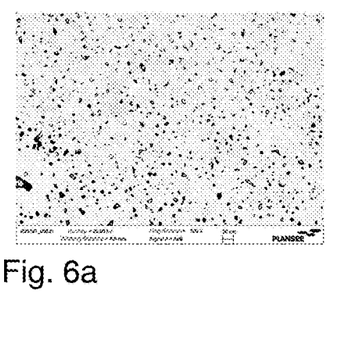
Figure 6B:
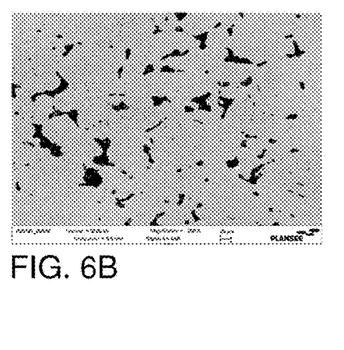
Figure 7A:
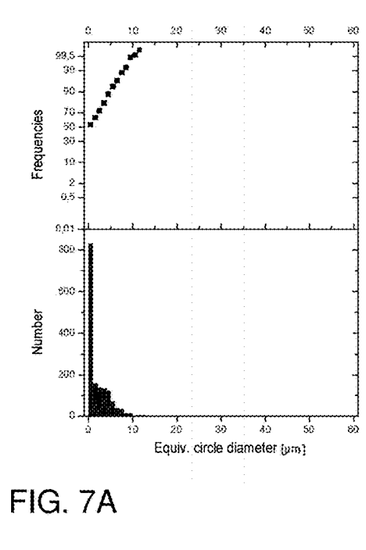
Figure 7B:
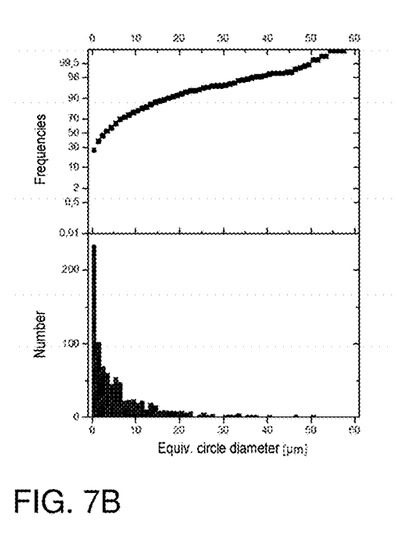
Figure 8A:
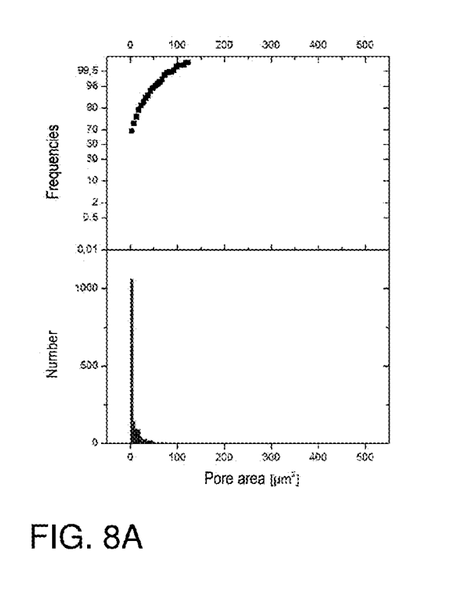
Figure 8B:
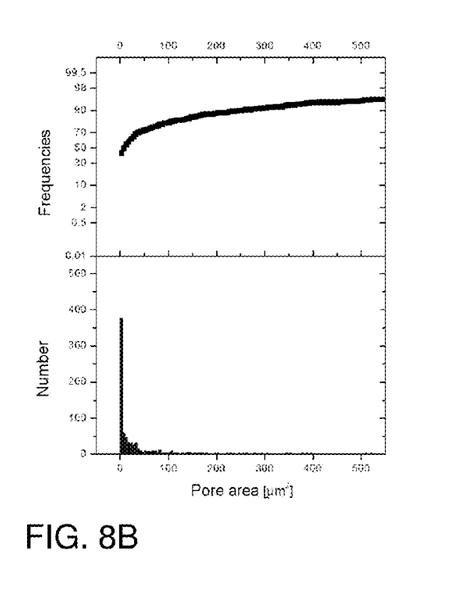

FIGS. 5a and 5b show components in section as an SEM image. FIGS. 6a and 6b show a detail view. The larger number of pores/oxide inclusions with at the same time a smaller pore/oxide inclusion size in the component according to the invention can be seen. FIGS. 7a and 7b show the distribution of the equivalent diameter. The arithmetic mean in the case of the component according to the invention is at 2.0 μm, compared with 7.0 μm in the case of prior art. The spread is between 0.3 and 13.0 μm or 0.6 and 63.7 μm, respectively. FIGS. 8a and 8b show the pore area distribution, which in the case of the component according to the invention is 7.3 μm² in the arithmetic mean, compared with 107 μm² in the case of the prior art. The scatter is between 0.05 to 133.1 μm² in the case of the component according to the invention, compared with 0.31 to 3182 μm² in the case of the prior art. The pore density according to the invention is 132 957 mm$^{-2}$ in the arithmetic mean, compared with 810 mm$^{-2}$ in the case of the prior art. The spread is between 79 327 and 211 800 mm$^{-2}$ or 715 and 895 mm$^{-2}$, respectively. The values given in FIGS. 2, 7 and 8 each subsume pores and oxide inclusions, as is clear from the description of the measurement.

The invention claimed is:

1. A powder metallurgical component, comprising:
   a chromium content of at least 80% by weight;
   at least one of pores or oxide inclusions present in the component;
   said oxide inclusions having a chromium oxide content of at least 90 mol. %;
   a sum of said pores and said oxide inclusions at a cut surface through the component in at least one region amounting to a number per unit area of at least 10,000 per mm²; and
   said region having an $Al_2O_3$ content of <500 μg per 1 g of the component.

2. The powder metallurgical component according to claim 1, wherein said number per unit area of said sum of said pores and said oxide inclusions at said cut surface is at least 90,000 per mm².

3. The powder metallurgical component according to claim 1, wherein said chromium content is at least 90% by weight.

4. The powder metallurgical component according to claim 1, wherein said region of the component has a density over an entire component thickness of between 70% and 95% of a theoretical density.

5. The powder metallurgical component according to claim 1, wherein at least 90% of said pores and at least 90% of said oxide inclusions each have a maximum equivalent diameter of not more than 12 μm.

6. The powder metallurgical component according to claim 1, wherein at least 90% of said pores and at least 90% of said oxide inclusions each have an area of not more than 100 μm².

7. The powder metallurgical component according to claim 1, wherein said region has a total oxygen content of <20,000 μg per 1 g of the component.

8. The powder metallurgical component according to claim 1, wherein said region has a total nitrogen content of <2000 μg per 1 g of the component.

9. The powder metallurgical component according to claim 1, which further comprises an oxygen content increasing over a component thickness from a middle to edges of the component.

10. A process for producing a powder metallurgical component having a chromium content of at least 80% by weight, at least one of pores or oxide inclusions present in the component, and a sum of the pores and the oxide inclusions at a cut surface through the component in at least one region amounting to a number per unit area of at least 10,000 per mm$^2$, the process comprising the following steps:

(i) providing a powder batch including chromium and optionally other metals, the chromium having a content of at least 80% by weight, based on a total metal content, and the powder batch including powder having a BET surface area of ≥0.05 m$^2$/g;

(ii) pressing the powder batch to form a compact;

(iv) sintering the compact at from 1100 to 1500° C.;

(v) oxidizing the sintered component in a presence of an oxygen source; and (vi) removing the oxide layer from the surface;

(vii) providing the oxide inclusions with a chromium oxide content of at least 90 mol. %; and (viii) providing the region with an Al$_2$O$_3$ content of <500 μg per 1 g of the component.

11. The process according to claim 10, which further comprises (iii) presintering the compact at from 600 to 1000° C., between step (ii) pressing the powder batch to form a compact and step (iv) sintering the compact at from 1100 to 1500° C.

12. The process according to claim 10, wherein the oxygen source is selected from the group consisting of H$_2$O, O$_2$, CO$_2$ and mixtures thereof.

13. The process according to claim 10, which further comprises carrying out the sintering step under a hydrogen atmosphere.

14. The process according to claim 11, which further comprises carrying out the presintering step under a hydrogen atmosphere.

15. The process according to claim 11, which further comprises carrying out a calibration pressing operation between the presintering step and the sintering step.

16. The process according to claim 15, which further comprises carrying out the calibration pressing operation at a specific pressing pressure of from 500 to 1000 MPa.

17. The process according to claim 10, which further comprises, before pressing, adding a pressing aid to the powder batch in an amount of from 0.1% by weight to 5% by weight, based on an amount of the powder batch.

18. The process according to claim 10, wherein the powder batch including chromium and optionally other metals includes at least 90% by weight chromium, based on a total metal content.

* * * * *